United States Patent
Kato et al.

(10) Patent No.: US 10,510,487 B2
(45) Date of Patent: Dec. 17, 2019

(54) MULTI-LAYER CERAMIC ELECTRONIC COMPONENT AND METHOD OF PRODUCING THE SAME

(71) Applicant: Taiyo Yuden Co., Ltd., Tokyo (JP)

(72) Inventors: Yasunari Kato, Tokyo (JP); Joji Kobayashi, Tokyo (JP); Toshimitsu Kogure, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 9 days.

(21) Appl. No.: 15/387,081

(22) Filed: Dec. 21, 2016

(65) Prior Publication Data

US 2017/0186546 A1  Jun. 29, 2017

(30) Foreign Application Priority Data

Dec. 25, 2015 (JP) .................. 2015-253171
Sep. 20, 2016 (JP) .................. 2016-183259

(51) Int. Cl.
  *H01G 4/30* (2006.01)
  *H01G 4/12* (2006.01)
  *H01G 4/232* (2006.01)
  *H01G 4/008* (2006.01)

(52) U.S. Cl.
  CPC ............. *H01G 4/30* (2013.01); *H01G 4/0085* (2013.01); *H01G 4/12* (2013.01); *H01G 4/232* (2013.01)

(58) Field of Classification Search
  None
  See application file for complete search history.

(56) References Cited

U.S. PATENT DOCUMENTS

| | | | | |
|---|---|---|---|---|
| 4,771,520 A * | 9/1988 | Tanaka | ...................... | H01G 4/30 29/25.42 |
| 8,351,180 B1 * | 1/2013 | Ahn | ........................ | H01G 4/30 361/303 |
| 8,508,915 B2 * | 8/2013 | Kim | ...................... | H01G 4/0085 361/305 |

(Continued)

FOREIGN PATENT DOCUMENTS

| | | |
|---|---|---|
| JP | 06-349669 A | 12/1994 |
| JP | H07-120599 B2 | 12/1995 |

(Continued)

OTHER PUBLICATIONS

Office Action dated Apr. 5, 2018 in Japanese Application No. 2016-183259, along with its English Translation.

(Continued)

*Primary Examiner* — Dion Ferguson
(74) *Attorney, Agent, or Firm* — Saliwanchik, Lloyd & Eisenschenk

(57) ABSTRACT

A method of producing a multi-layer ceramic electronic component includes: preparing a multi-layer sheet including laminated ceramic sheets, and internal electrodes disposed between the ceramic sheets; cutting the multi-layer sheet to produce a multi-layer chip having a side surface from which the internal electrodes are exposed; removing a superficial layer of the side surface of the multi-layer chip; and providing a side margin to the side surface of the multi-layer chip, the superficial layer being removed from the side surface.

3 Claims, 16 Drawing Sheets

(56) References Cited

U.S. PATENT DOCUMENTS

| | | | |
|---|---|---|---|
| 8,520,364 B2* | 8/2013 | Morito | H01G 2/00 |
| | | | 361/306.1 |
| 9,384,897 B2* | 7/2016 | Kim | H01G 4/30 |
| 2008/0304204 A1* | 12/2008 | Suzuki | H01G 4/012 |
| | | | 361/321.3 |
| 2009/0310276 A1* | 12/2009 | Tashima | H01G 4/012 |
| | | | 361/303 |
| 2012/0147516 A1* | 6/2012 | Kim | H01G 4/232 |
| | | | 361/301.4 |
| 2012/0229951 A1* | 9/2012 | Kim | H01G 4/005 |
| | | | 361/321.2 |
| 2013/0199717 A1* | 8/2013 | Tanaka | B32B 38/0004 |
| | | | 156/264 |
| 2014/0301014 A1* | 10/2014 | Kim | H01G 4/30 |
| | | | 361/301.4 |
| 2014/0362492 A1* | 12/2014 | Lee | H01G 4/30 |
| | | | 361/301.4 |
| 2016/0351335 A1* | 12/2016 | Kato | H01G 4/30 |
| 2017/0076869 A1 | 3/2017 | Okai et al. | |

FOREIGN PATENT DOCUMENTS

| | | |
|---|---|---|
| JP | 2003-109837 A | 4/2003 |
| JP | 2004-228508 A | 8/2004 |
| JP | 2005-123288 A | 5/2005 |
| JP | 2012209539 A | 10/2012 |
| JP | 2014-036089 A | 2/2014 |
| JP | 2014-187216 A | 10/2014 |
| JP | 2017-59815 A | 3/2017 |

OTHER PUBLICATIONS

Office Action dated Jul. 31, 2018 in Japanese Application No. 2016-183259, along with its English translation.
Office Action dated Jul. 2, 2018 in Korean Application No. 10-2016-0169560.

* cited by examiner

MULTI-LAYER CERAMIC ELECTRONIC COMPONENT AND METHOD OF PRODUCING THE SAME

CROSS REFERENCE TO RELATED APPLICATIONS

This application claims priority under 35 U.S.C. § 119 to Japanese Patent Application Nos. 2015-253171, filed Dec. 25, 2015, and 2016-183259, filed Sep. 20, 2016, which are herein incorporated by reference in their entirety.

BACKGROUND

The present invention relates to a multi-layer ceramic electronic component including side margins provided in a subsequent step and to a method of producing the multi-layer ceramic electronic component.

Along with miniaturization and achievement of high performance of electronic devices, there have recently been increasingly strong demands for miniaturization and increase in capacity with respect to multi-layer ceramic capacitors used in the electronic devices. In order to meet those demands, it is effective to enlarge internal electrodes of the multi-layer ceramic capacitor. In order to enlarge the internal electrodes, it is necessary to thin side margins for ensuring insulation properties of the periphery of the internal electrodes.

Meanwhile, in a general method of producing a multi-layer ceramic capacitor, it is difficult to form side margins having a uniform thickness because of precision in each step (e.g., patterning of internal electrodes, cutting of a multi-layer sheet, etc.). Thus, in such a method of producing a multi-layer ceramic capacitor, as the side margins are made thinner, it is more difficult to ensure insulation properties of the periphery of the internal electrodes.

Japanese Patent Application Laid-open No. 2012-209539 discloses a technique of providing side margins in a subsequent step. In other words, in this technique, a multi-layer chip including internal electrodes exposed to side surfaces of the multi-layer chip is produced by cutting a multi-layer sheet, and side margins are then provided to the side surfaces of the multi-layer chip. This makes it possible to form side margins having a uniform thickness, and to ensure insulation properties of the periphery of the internal electrodes also when the side margins are made thinner.

BRIEF SUMMARY

For cutting of the multi-layer sheet, cutting with use of a push-cutting blade, a rotary blade, or the like is widely performed. The multi-layer sheet is cut into multi-layer chips with use of various blades. At that time, a blade may drag the internal electrodes during the cutting of the multi-layer sheet, and the internal electrodes may be elongated along the cut surface. This makes it difficult to obtain a multi-layer ceramic capacitor having designed performance when a short circuit occurs between adjacent internal electrodes in the side surface of the multi-layer chip.

In view of the circumstances as described above, it is desirable to provide a multi-layer ceramic electronic component and a method of producing the multi-layer ceramic electronic component, which are capable of providing a side margin in a subsequent step while preventing a short circuit between internal electrodes.

According to an embodiment of the present invention, there is provided a method of producing a multi-layer ceramic electronic component, the method including: preparing a multi-layer sheet including laminated ceramic sheets, and internal electrodes disposed between the ceramic sheets; cutting the multi-layer sheet to produce a multi-layer chip having a side surface from which the internal electrodes are exposed; removing a superficial layer of the side surface of the multi-layer chip; and providing a side margin to the side surface of the multi-layer chip, the superficial layer being removed from the side surface.

With this configuration, the superficial layer of the side surface of the multi-layer chip to which the side margin is provided is previously removed. This can prevent a short circuit between the internal electrodes in the side surface of the multi-layer chip due to drag of the internal electrodes, adhesion of foreign substances, and the like at the time of cutting of the multi-layer sheet.

The multi-layer sheet may be cut with one of a push-cutting blade and a rotary blade.

This configuration can prevent a short circuit between the internal electrodes in the side surface of the multi-layer chip, even when the multi-layer sheet is cut with a push-cutting blade or a rotary blade, which is relatively easy to drag the internal electrodes.

The side surface of the multi-layer chip may be grinder to remove the superficial layer.

The side surface of the multi-layer chip may be subjected to blasting to remove the superficial layer.

Those configurations can effectively prevent a short circuit between the internal electrodes in the side surface of the multi-layer chip.

The side surface of the multi-layer chip may be irradiated with laser to remove the superficial layer.

The side surface of the multi-layer chip may include overlapping irradiation areas that are irradiated with the laser. This enables the entire areas of the side surface of the multi-layer chip to be irraditated with the laser without gaps also when a spot diameter of the laser is small.

The irradiation areas may be rectangular. This can reduce the amount of overlap of the irradiation areas, and thus enables the entire areas of the side surface of the multi-layer chip to be efficiently irraditated with the laser.

The laser may have a top-hat output distribution. This makes the output distribution of the laser uniform in the entire areas of the irradiation areas. Therefore, this configuration enables the positions, intervals and the like of the irradiation areas to be determined without considering the output distribution of the laser.

According to another embodiment of the present invention, there is provided a multi-layer ceramic electronic component including a multi-layer chip and a side margin.

The multi-layer chip includes ceramic layers laminated in a first direction, internal electrodes disposed between the ceramic layers, and a side surface that is oriented in a second direction orthogonal to the first direction, is adjacent to end portions of the internal electrodes, and includes overlap marks formed by laser.

The side margin covers the side surface of the multi-layer chip.

The end portions of the internal electrodes may include pores in the overlap marks.

The overlap marks may be arrayed at predetermined intervals.

The overlap marks may each form a predetermined pattern.

In those configurations, since the superficial layer is removed by laser irradiation without gaps on the side surface of the multi-layer chip, a short circuit between the internal electrodes in the side surface of the multi-layer chip can be effectively prevented.

It is possible to provide a multi-layer ceramic electronic component and a method of producing the multi-layer ceramic electronic component, which are capable of providing a side margin in a subsequent step while preventing a short circuit between internal electrodes.

These and other objects, features and advantages of the present invention will become more apparent in light of the following detailed description of embodiments thereof, as illustrated in the accompanying drawings.

DETAILED DESCRIPTION

Hereinafter, embodiments of the present invention will be described with reference to the drawings.

In the figures, an X axis, a Y axis, and a Z axis orthogonal to one another are shown as appropriate. The X axis, the Y axis, and the Z axis are common in all figures.

1. First Embodiment

1.1 Configuration of Multi-Layer Ceramic Capacitor 10

Figure 1:
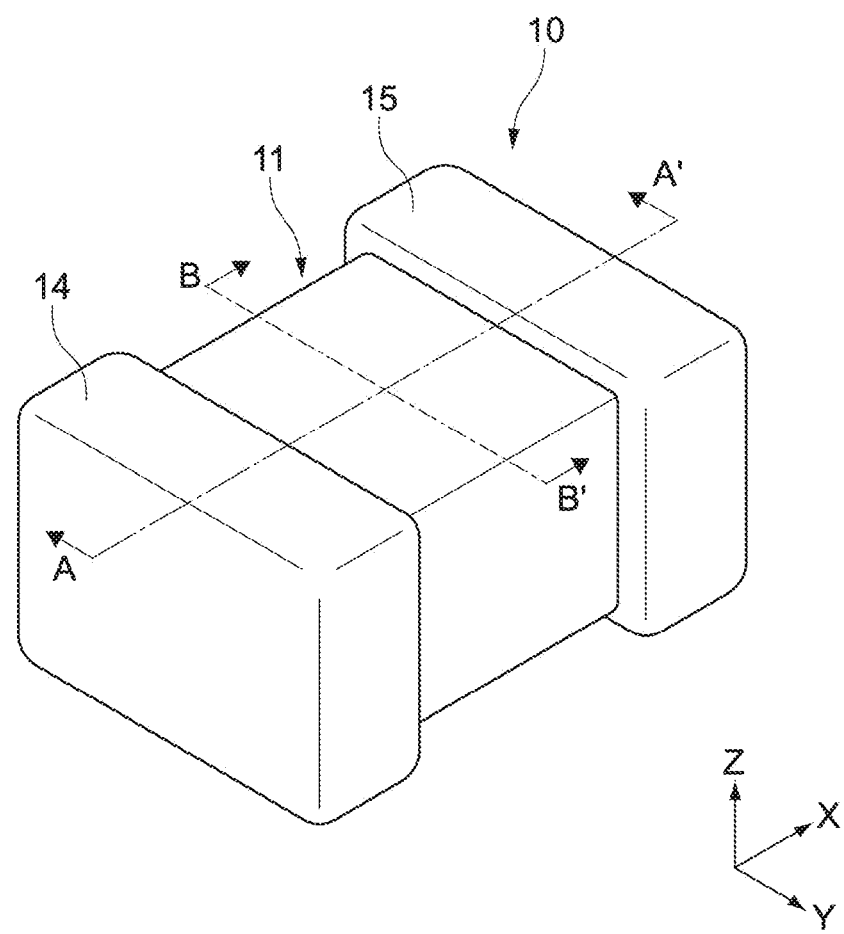
FIG. 1 is a perspective view of a multi-layer ceramic capacitor according to a first embodiment of the present invention.
Figure 2:
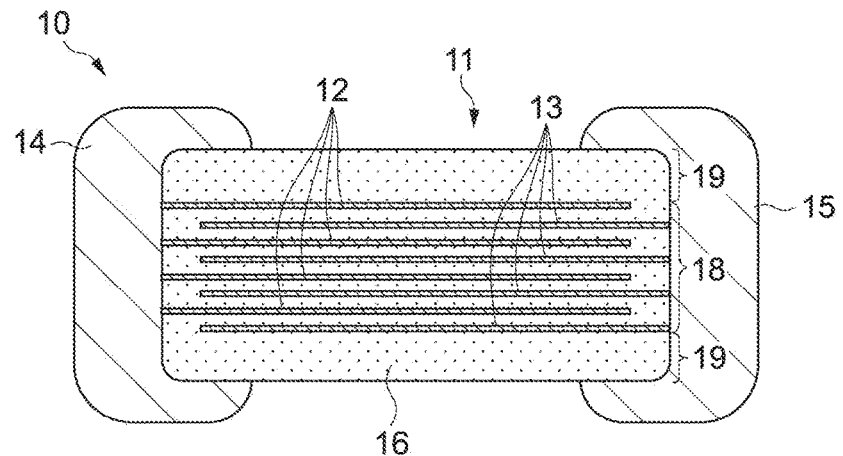
FIG. 2 is a cross-sectional view of the multi-layer ceramic capacitor taken along the A-A' line in FIG. 1.
Figure 3:
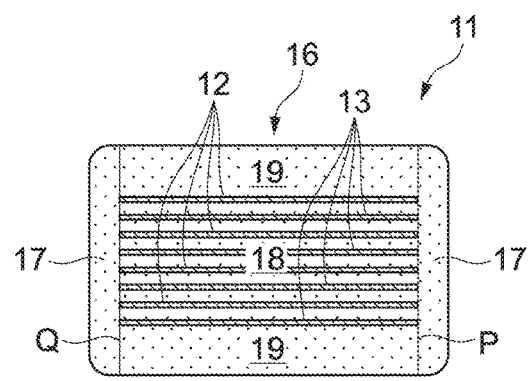
FIG. 3 is a cross-sectional view of the multi-layer ceramic capacitor taken along the B-B' line in FIG. 1.

FIGS. 1 to 3 each show a multi-layer ceramic capacitor 10 according to a first embodiment of the present invention. FIG. 1 is a perspective view of the multi-layer ceramic capacitor 10. FIG. 2 is a cross-sectional view of the multi-layer ceramic capacitor 10 taken along the A-A' line in FIG. 1. FIG. 3 is a cross-sectional view of the multi-layer ceramic capacitor 10 taken along the B-B' line in FIG. 1.

The multi-layer ceramic capacitor 10 includes a body 11, a first external electrode 14, and a second external electrode 15. The first external electrode 14 and the second external electrode 15 are apart from each other and face each other in an X-axis direction while sandwiching the body 11 therebetween.

The body 11 has two end surfaces oriented in the X-axis direction, two side surfaces oriented in a Y-axis direction, and two main surfaces oriented in a Z-axis direction. Ridges connecting the respective surfaces of the body 11 are chamfered. In the body 11, for example, a dimension in the X-axis direction can be set to 1.0 mm and dimensions in the Y- and Z-axis directions can be set to 0.5 mm.

It should be noted that the form of the body 11 is not limited to the form as described above. For example, the surfaces of the body 11 may be curved surfaces, and the body 11 may be rounded as a whole.

The first external electrode 14 and the second external electrode 15 cover both the end surfaces of the body 11 that are oriented in the X-axis direction, and extend to both the side surfaces oriented in the Y-axis direction and both the main surfaces oriented in the Z-axis direction, both the side surfaces and both the main surfaces being connected to both the end surfaces oriented in the X-axis direction. With this configuration, both of the first external electrode 14 and the second external electrode 15 have U-shaped cross sections in parallel with an X-Z plane and an X-Y plane.

The first external electrode 14 and the second external electrode 15 are each formed from a good conductor and function as terminals of the multi-layer ceramic capacitor 10. Examples of the good conductor forming the first and second external electrodes 14 and 15 include metal mainly containing nickel (Ni), copper (Cu), palladium (Pd), platinum (Pt), silver (Ag), gold (Au), or the like, and an alloy of those metals.

The first and second external electrodes 14 and 15 may have a single-layer structure or multi-layer structure.

The first and second external electrodes 14 and 15 of the multi-layer structure may be formed to have a double-layer structure including a base film and a surface film, or a three-layer structure including a base film, an intermediate film, and a surface film, for example.

The base film can be a baked film made of metal mainly containing nickel, copper, palladium, platinum, silver, gold, or the like, or an alloy of those metals, for example.

The intermediate film can be a plating film made of metal mainly containing platinum, palladium, gold, copper, nickel, or the like, or an alloy of those metals, for example.

The surface film can be a plating film made of metal mainly containing copper, tin, palladium, gold, zinc, or the like, or an alloy of those metals, for example.

The body 11 includes a multi-layer chip 16 and side margins 17.

The side margins 17 have a flat plate-like shape extending along the X-Z plane and cover both side surfaces P and Q of the multi-layer chip 16 that are oriented in the Y-axis direction.

The multi-layer chip 16 includes a capacitance forming unit 18 and covers 19. The covers 19 have a flat plate-like shape extending along the X-Y plane and cover both main surfaces of the capacitance forming unit 18 that are oriented in the Z-axis direction.

The side margins 17 and the covers 19 have main functions of protecting the capacitance forming unit 18 and ensuring insulation properties of the periphery of the capacitance forming unit 18.

The capacitance forming unit 18 includes a plurality of first internal electrodes 12 and a plurality of second internal electrodes 13. The first internal electrodes 12 and the second internal electrodes 13 each have a sheet-like shape extending along the X-Y plane and are alternately disposed in the Z-axis direction. The first internal electrodes 12 are connected to the first external electrode 14 and are apart from the second external electrode 15. To the contrary, the second internal electrodes 13 are connected to the second external electrode 15 and are apart from the first external electrode 14.

The first internal electrodes 12 and the second internal electrodes 13 are each formed from a good conductor and function as internal electrodes of the multi-layer ceramic capacitor 10. Examples of the good conductor forming the first and second internal electrodes 12 and 13 include nickel (Ni), copper (Cu), palladium (Pd), platinum (Pt), silver (Ag), gold (Au), and a metal material including an alloy of those metals.

The capacitance forming unit 18 is made of dielectric ceramics. In the multi-layer ceramic capacitor 10, in order to increase capacitances of respective layers made of dielectric ceramics (hereinafter, referred to as dielectric ceramic layers in some cases) provided between the first and second internal electrodes 12 and 13, dielectric ceramics having a high dielectric constant is used as a material forming the capacitance forming unit 18. Examples of the dielectric ceramics having a high dielectric constant include a material having a Perovskite structure containing barium (Ba) and titanium (Ti), which is typified by barium titanate ($BaTiO_3$).

The side margins 17 and the covers 19 are also made of dielectric ceramics. A material of the side margins 17 and the covers 19 may be insulating ceramics, but use of a material similar to the material of the capacitance forming unit 18 leads to improvement in production efficiency and suppression of internal stress in the body 11.

With the configuration described above, when a voltage is applied between the first external electrode 14 and the second external electrode 15 in the multi-layer ceramic capacitor 10, a voltage is applied to the layers made of dielectric ceramics between the first and second internal electrodes 12 and 13. With this configuration, the multi-layer ceramic capacitor 10 stores charge corresponding to the voltage applied between the first external electrode 14 and the second external electrode 15.

It should be noted that the configuration of the multi-layer ceramic capacitor 10 is not limited to a specific configuration, and a well-known configuration can be used as appropriate in accordance with the size and performance expected for the multi-layer ceramic capacitor 10. For example, the number of first internal electrodes 12 and second internal electrodes 13 in the capacitance forming unit 18 can be determined as appropriate.

1.2. Method of Producing Multi-Layer Ceramic Capacitor 10

Figure 4:
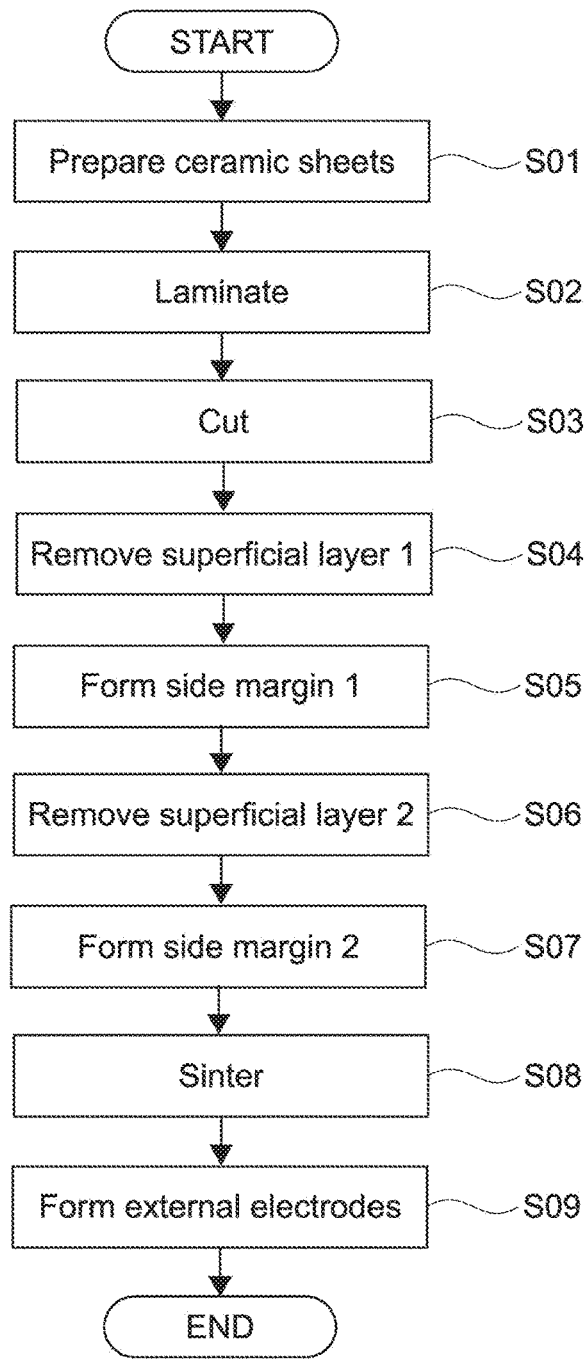
FIG. 4 is a flowchart showing a method of producing the multi-layer ceramic capacitor.
Figure 5:
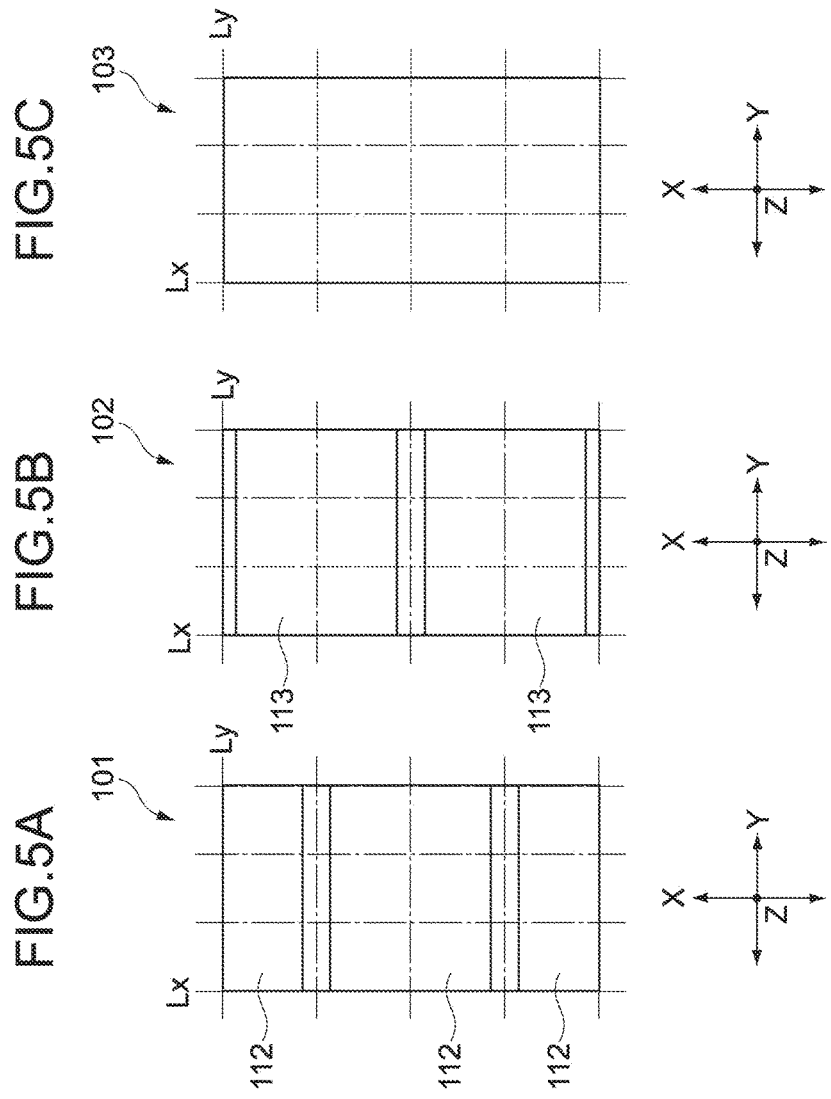
FIGS. 5A, 5B, and 5C are plan views of ceramic sheets prepared in Step S01 of the production method.

FIG. 4 is a flowchart showing a method of producing the multi-layer ceramic capacitor 10. FIGS. 5A to 15 are views showing a production process of the multi-layer ceramic capacitor 10. Hereinafter, the method of producing the multi-layer ceramic capacitor 10 will be described along FIG. 4 with reference to FIGS. 5A to 15.

1.2.1 Step S01: Preparation of Ceramic Sheets

In Step S01, first ceramic sheets 101 and second ceramic sheets 102 for forming the capacitance forming unit 18, and third ceramic sheets 103 for forming the covers 19 are prepared.

FIGS. 5A, 5B, and 5C are plan views of the first, second, and third ceramic sheets 101, 102, and 103, respectively. FIG. 5A shows the first ceramic sheet 101, FIG. 5B shows the second ceramic sheet 102, and FIG. 5C shows the third ceramic sheet 103. The first, second, and third ceramic sheets 101, 102, and 103 are configured as unsintered dielectric green sheets and formed into a sheet shape by using a roll coater or a doctor blade, for example.

At the stage of Step S01, the first, second, and third ceramic sheets 101, 102, and 103 are not yet cut into the multi-layer ceramic capacitors 10. FIGS. 5A, 5B, and 5C each show cutting lines Lx and Ly used when the sheets are cut into the multi-layer ceramic capacitors 10. The cutting lines Lx are parallel to the X axis, and the cutting lines Ly are parallel to the Y axis.

As shown in FIGS. 5A, 5B, and 5C, unsintered first internal electrodes 112 corresponding to the first internal electrodes 12 are formed on the first ceramic sheet 101, and unsintered second internal electrodes 113 corresponding to the second internal electrodes 13 are formed on the second ceramic sheet 102. It should be noted that no internal electrodes are formed on the third ceramic sheet 103 corresponding to the covers 19.

The first and second internal electrodes 112 and 113 can be formed using any electrical conductive paste. For formation of the first and second internal electrodes 112 and 113 by use of an electrical conductive paste, a screen printing method or a gravure printing method can be used, for example.

Each of the first and second internal electrodes 112 and 113 is disposed over two areas and extends like a belt in the Y-axis direction. The two areas are adjacent to each other in the X-axis direction and divided by the cutting line Ly. The first internal electrodes 112 are shifted from the second internal electrodes 113 in the X-axis direction by one row including the areas divided by the cutting lines Ly. In other words, the cutting line Ly passing through the center of the first internal electrode 112 passes through an area between the second internal electrodes 113, and the cutting line Ly passing through the center of the second internal electrode 113 passes through an area between the first internal electrodes 112.

1.2.2 Step S02: Lamination

In Step S02, the first, second, and third ceramic sheets 101, 102, and 103 prepared in Step S01 are laminated, to produce a multi-layer sheet 104.

Figure 6:
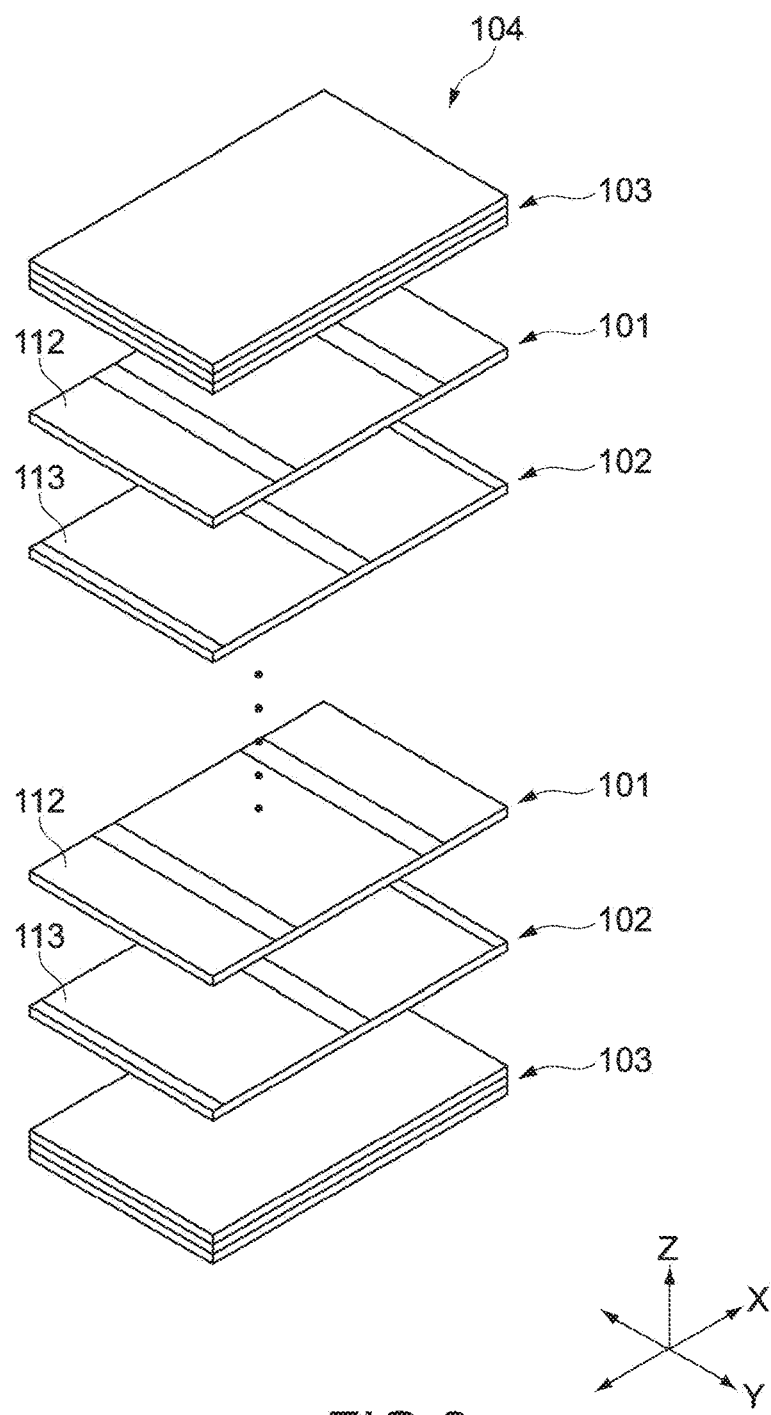
FIG. 6 is a perspective view of a multi-layer sheet in Step S02 of the production method.

FIG. 6 is a perspective view of the multi-layer sheet 104 obtained in Step S02. For the purpose of description, FIG. 6 shows the first, second, and third ceramic sheets 101, 102, and 103 in an exploded manner. In an actual multi-layer sheet 104, however, the first, second, and third ceramic sheets 101, 102, and 103 are pressure-bonded by hydrostatic pressing, uniaxial pressing, or the like for integration. With this configuration, a high-density multi-layer sheet 104 is obtained.

In the multi-layer sheet 104, the first ceramic sheets 101 and the second ceramic sheets 102 that correspond to the capacitance forming unit 18 are alternately laminated in the Z-axis direction.

Further, in the multi-layer sheet 104, the third ceramic sheets 103 corresponding to the covers 19 are laminated on the uppermost and lowermost surfaces of the first and second ceramic sheets 101 and 102 alternately laminated in the Z-axis direction. It should be noted that in the example shown in FIG. 6, three third ceramic sheets 103 are laminated on each of the uppermost and lowermost surfaces of the laminated first and second ceramic sheets 101 and 102, but the number of third ceramic sheets 103 can be changed as appropriate.

1.2.3 Step S03: Cutting

In Step S03, the multi-layer sheet 104 obtained in Step S02 is cut to produce unsintered multi-layer chips 116. In Step S03, the multi-layer sheet 104 is cut by push-cutting.

Figure 7:
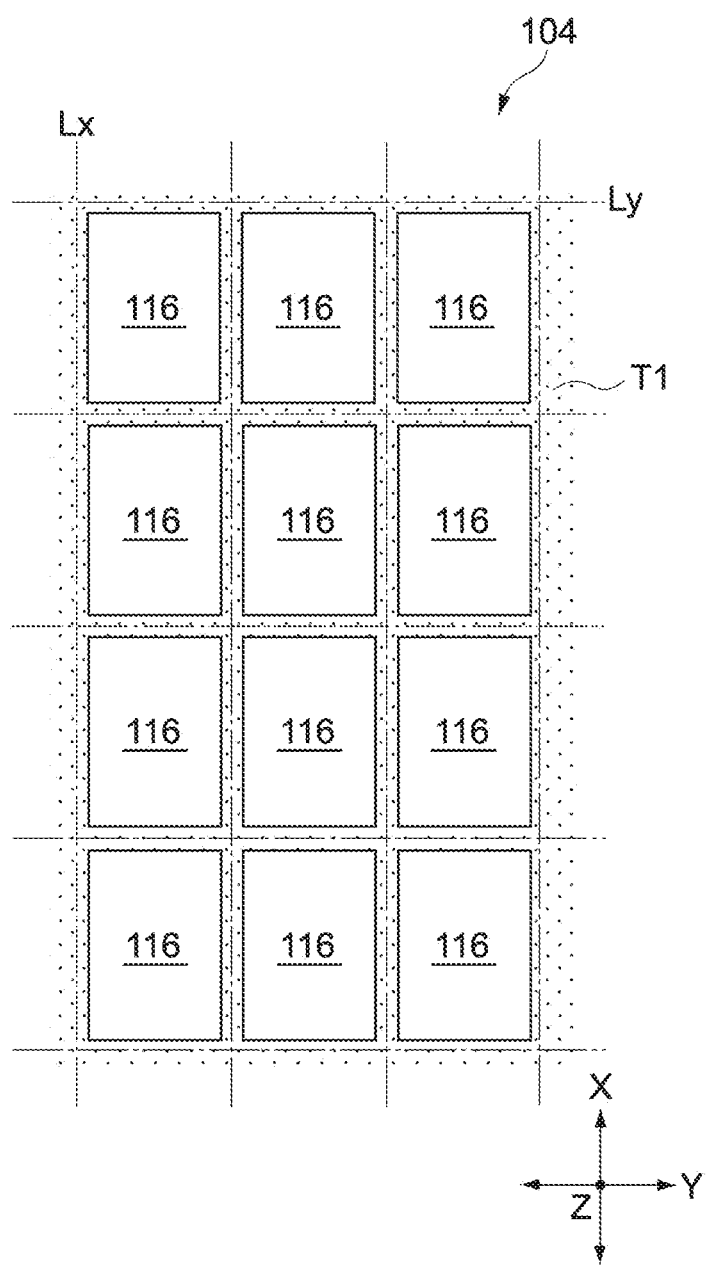
FIG. 7 is a plan view of the multi-layer sheet in Step S03 of the production method.

FIG. 7 is a plan view of the multi-layer sheet 104 after Step S03. The multi-layer sheet 104 is cut along the cutting lines Lx and Ly while being attached to a tape T1 as a holding member. With this configuration, the multi-layer sheet 104 is singulated, and the multi-layer chips 116 are obtained.

Figure 8A:
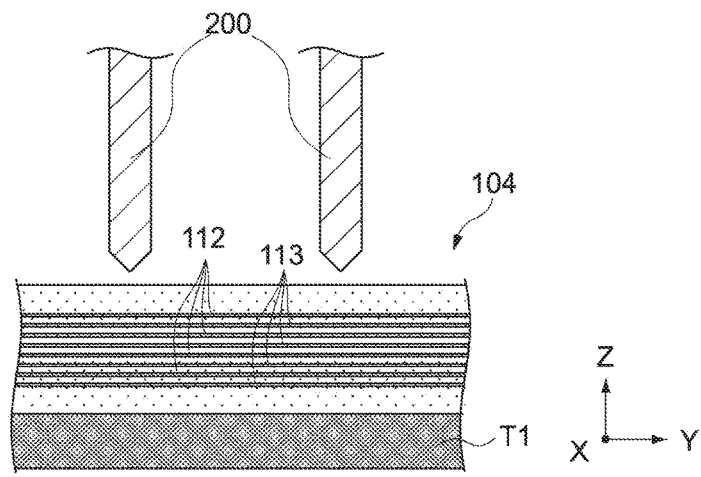
FIGS. 8A, 8B, and 8C are cross-sectional views of the multi-layer sheet in Step S03 of the production method.
Figure 8B:
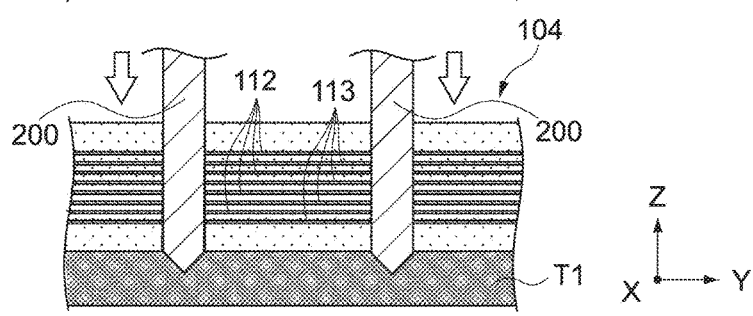
Figure 8C:
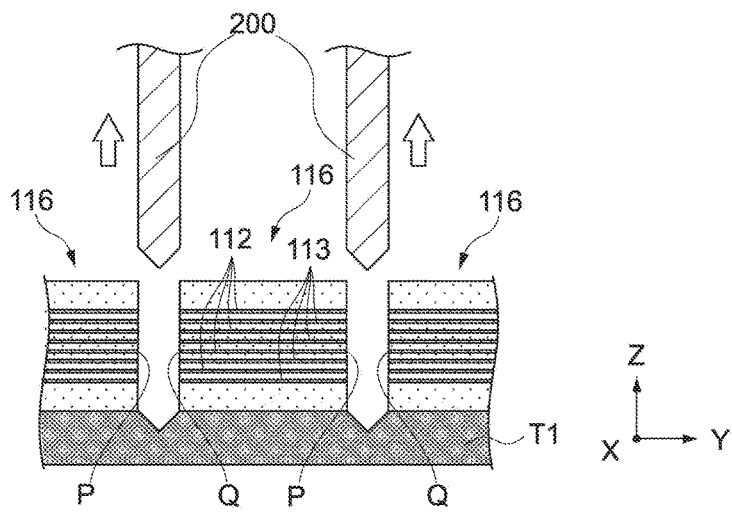

FIGS. 8A, 8B, and 8C are cross-sectional views of the multi-layer sheet 104 showing the process of Step S03. In Step S03, a cutting apparatus including a push-cutting blade 200 is used.

First, as shown in FIG. 8A, the push-cutting blade 200 oriented downward in the Z-axis direction is disposed above the multi-layer sheet 104 in the Z-axis direction.

Next, as shown in FIG. 8B, the push-cutting blade 200 is moved downward in the Z-axis direction until the push-cutting blade 200 reaches the tape T1, so that the multi-layer sheet 104 is cut. At that time, the push-cutting blade 200 does not penetrate the tape T1 such that the tape T1 is not cut.

Subsequently, as shown in FIG. 8C, the push-cutting blade 200 is moved upward in the Z-axis direction and pulled out of the multi-layer sheet 104.

With this configuration, the multi-layer sheet 104 is singulated into multi-layer chips 116. At that time, the tape T1 is not cut and connects the multi-layer chips 116. This makes it possible to collectively handle the multi-layer chips 116 in subsequent steps and to improve production efficiency.

Cut surfaces of the multi-layer sheet 104 that are formed in Step S03 are side surfaces P and Q and end surfaces of the multi-layer chips 116, the side surfaces P and Q being oriented in the Y-axis direction, the end surfaces being oriented in the X-axis direction.

Figure 9A:
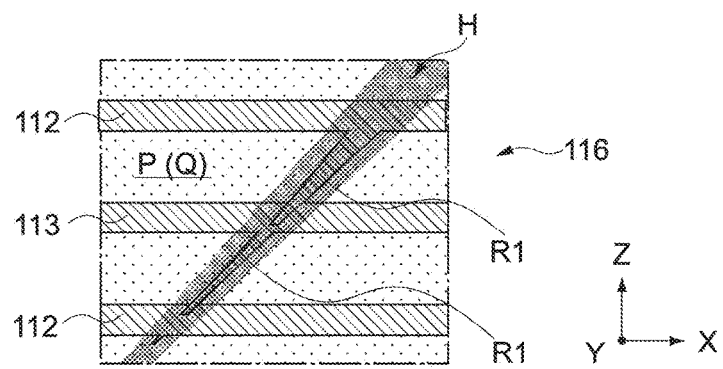
FIGS. 9A, 9B, and 9C are cross-sectional views of exemplary side surfaces of a multi-layer chip after Step S03 of the production method.
Figure 9B:
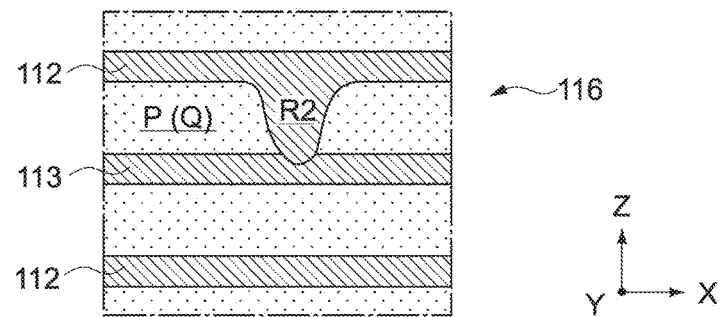
Figure 9C:
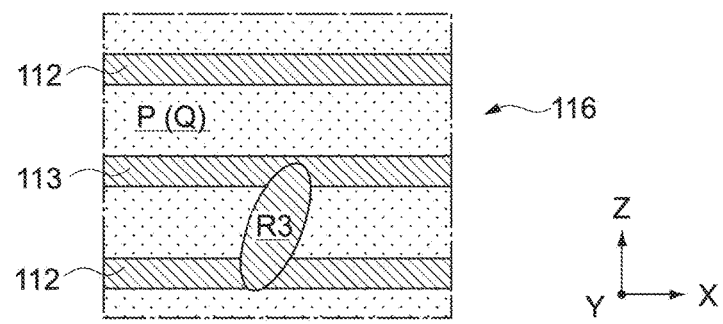

FIGS. 9A, 9B, and 9C are enlarged cross-sectional views of exemplary side surfaces P and Q of the multi-layer chip 116 immediately after Step S03. In other words, the side surfaces P and Q of the multi-layer chip 116 immediately after the cutting may be those as exemplified in FIGS. 9A to 9C.

In the side surface P, Q shown in FIG. 9A, a scratch H is formed due to, for example, entry of foreign substances by the push-cutting blade 200 in Step S03. In the course of formation of the scratch H in Step S03, when the push-cutting blade 200 drags the first and second internal electrodes 112 and 113, the first and second internal electrodes 112 and 113 are elongated along the scratch H. Thus, a spreading section R1 is formed. When the spreading section R1 reaches one of the first and second internal electrodes 112 and 113 from the other one, the first and second internal electrodes 112 and 113 are connected to each other via the spreading section R1, and a short circuit thus occurs.

In the side surface P, Q shown in FIG. 9B, the scratch H as shown in FIG. 9A is not formed. However, also in this case, when the push-cutting blade 200 drags the first and second internal electrodes 112 and 113 in Step S03, the first and second internal electrodes 112 and 113 are elongated along the side surface P, Q. Thus, a spreading section R2 is formed. When the spreading section R2 reaches one of the first and second internal electrodes 112 and 113 from the other one, the first and second internal electrodes 112 and 113 are connected to each other via the spreading section R2, and a short circuit thus occurs.

In the side surface P, Q shown in FIG. 9C, a foreign substance R3 adheres. It is assumed that the foreign substance R3 is a conductive substance generated by the first and second internal electrodes 112 and 113, the push-cutting blade 200, and the like in Step S03. When such a foreign substance R3 adheres across the first and second internal electrodes 112 and 113, the first and second internal electrodes 112 and 113 are connected to each other via the foreign substance R3, and a short circuit thus occurs.

In such a manner, in the multi-layer chip 116 immediately after Step S03, the first internal electrode 112 and the second internal electrode 113 may short-circuit in the side surfaces P and Q. When a short circuit occurs between the first internal electrode 112 and the second internal electrode 113, it is difficult to obtain a multi-layer ceramic capacitor 10 having target performance.

In particular, when the interval between the first internal electrode 112 and the second internal electrode 113 is small, that is, when the dielectric ceramic layer between the first internal electrode 112 and the second internal electrode 113 is thin, a short circuit between the first internal electrode 112 and the second internal electrode 113 is easy to occur in the side surfaces P and Q. Specifically, when the dielectric ceramic layer between the first internal electrode 112 and the second internal electrode 113 is thinner than the first and second internal electrodes 112 and 113, or when the dielectric ceramic layer has a thickness of 1 μm or less, a short circuit between the first internal electrode 112 and the second internal electrode 113 is particularly easy to occur in the side surfaces P and Q.

It should be noted that for the cutting of the multi-layer sheet 104, a technique using a blade different from the push-cutting blade may be used. For example, a rotary blade (e.g., dicing blade) may be used. Furthermore, for the cutting of the multi-layer sheet 104, a technique using no blade may be used. For example, laser cutting or water jet cutting may be used.

In any case, in Step S03, a short circuit may occur between the first internal electrode 112 and the second internal electrode 113 in the side surfaces P and Q of the multi-layer chip 116.

In this embodiment, Steps S04 and S06 (superficial-layer removal) are performed so as to resolve a short circuit between the first internal electrode 112 and the second internal electrode 113 in the side surfaces P and Q of the multi-layer chip 116.

1.2.4 Step S04: Superficial-Layer Removal 1

In Step S04, a superficial layer of the side surface P of the multi-layer chip 116 obtained in Step S03 is removed.

The spreading sections R1 and R2 and the foreign substance R3 shown in FIGS. 9A to 9C are included in the superficial layer of the side surface P immediately after Step S03. Thus, removal of the superficial layer of the side surface P in Step S04 leads to removal of the spreading sections R1 and R2 and the foreign substance R3. This resolves a short circuit between the first internal electrode 112 and the second internal electrode 113 in the side surface P.

The superficial layer of the side surface P to be removed in Step S04 can be set to an area having the depth of about 50 μm in the Y-axis direction from the side surface P of the multi-layer chip 116 obtained in Step S03, for example. It should be noted that the depth of the side surface P in the Y-axis direction, which is to be removed in Step S04, can be determined as appropriate such that the spreading sections R1 and R2 and the foreign substance R3 can be appropriately removed.

Figure 10:
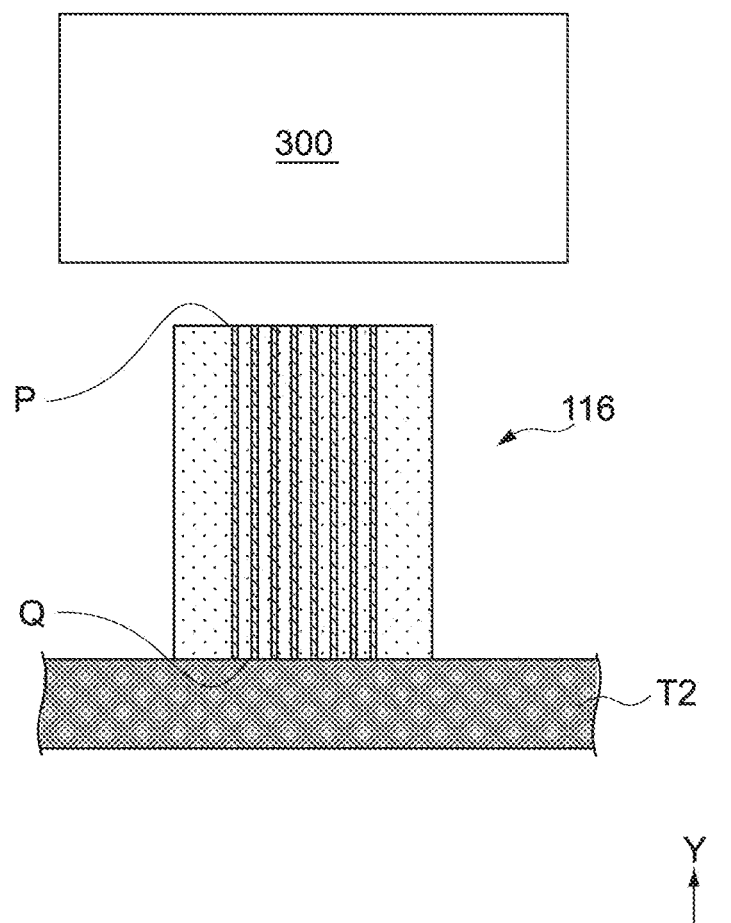
FIG. 10 is a cross-sectional view of the multi-layer chip in Step S04 of the production method.

FIG. 10 is a cross-sectional view of the multi-layer chip 116 in Step S04. In Step S04, the multi-layer chip 116 is bonded to a tape T2 from the tape T1, and the side surface Q is held by the tape T2. A superficial-layer removing apparatus 300 for removing the superficial layer of the side surface P is disposed so as to face the side surface P.

Figure 11:
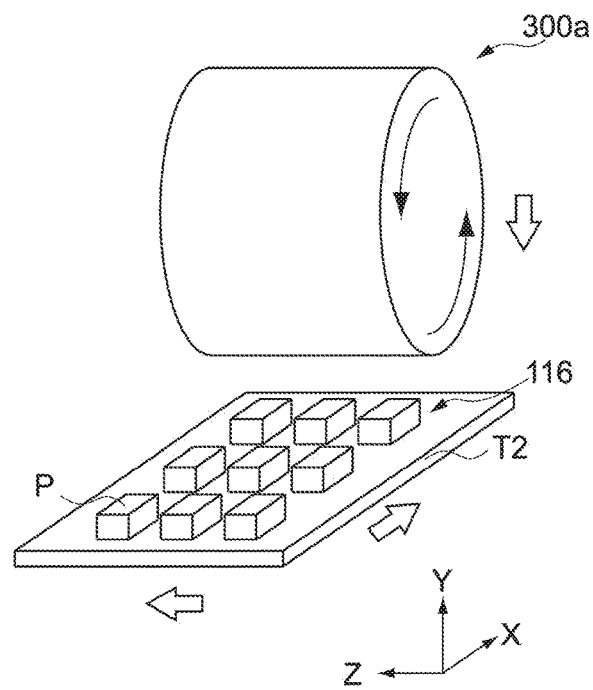
FIG. 11 is a perspective view of a superficial-layer removing apparatus used in Step S04 of the production method.

In this embodiment, a grinder 300a shown in FIG. 11 is used as the superficial-layer removing apparatus 300. In the example shown in FIG. 11, the multi-layer chips 116 are arrayed on the tape T2 and collectively subjected to Step S04. This improves production efficiency of the multi-layer ceramic capacitor 10.

The grinder 300a includes a circular cylinder having a central axis parallel to the Z axis. In the circular cylinder, the outer circumferential surface thereof is configured as a grinding surface. The grinder 300a rotates the circular cylinder about the central axis, brings the outer circumferential surface of the circular cylinder into contact with the side surfaces P of the multi-layer chips 116, and grinds the side surfaces P of the multi-layer chips 116, to remove the superficial layers of the side surfaces P of the multi-layer chips 116.

The tape T2 is moved as appropriate in the X-axis direction and the Z-axis direction, so that the superficial layers of the side surfaces P can be removed in all the multi-layer chips 116 arrayed on the tape T2. It should be noted that the circular cylinder of the grinder 300a may be moved in the X-axis direction and the Z-axis direction instead of moving the tape T2.

Figure 12:
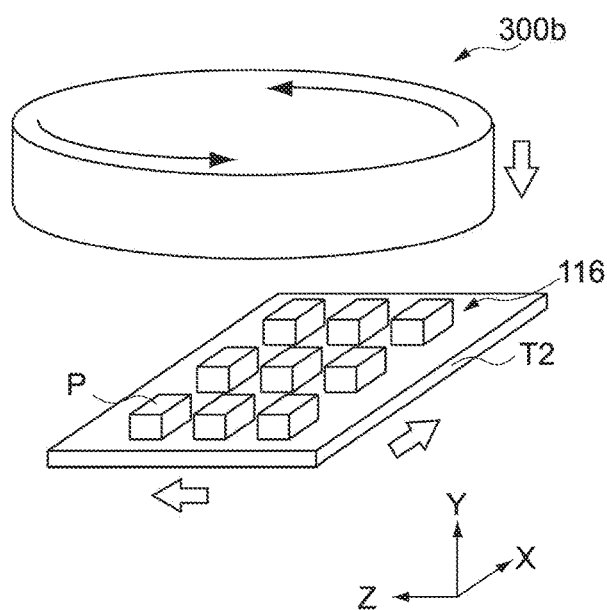
FIG. 12 is a perspective view of another superficial-layer removing apparatus used in Step S04 of the production method.

Instead of the grinder 300a shown in FIG. 11, a grinder 300b shown in FIG. 12 can also be used as the superficial-layer removing apparatus 300.

The grinder 300b includes a disc body having a central axis perpendicular to the Y axis. In the disc body, a flat surface thereof is configured as a grinding surface. The grinder 300b rotates the disc body about the central axis, brings the flat surface of the disc body into contact with the side surfaces P of the multi-layer chips 116, and grinds the side surfaces P of the multi-layer chips 116, to remove the superficial layers of the side surfaces P of the multi-layer chips 116.

The multi-layer chips 116 are then cleansed as needed, to remove grinding dust or the like adhering to the side surfaces P or the like.

1.2.5 Step S05: Formation of Side Margins 1

In Step S05, unsintered side margins 117 are formed on the side surfaces P of the multi-layer chips 116 obtained in Step S04.

In Step S05, a side margin sheet 117s for forming the side margins 117 is prepared. The side margin sheet 117s is configured as an unsintered dielectric green sheet, similar to the first, second, and third ceramic sheets 101, 102, and 103 prepared in Step S01. The side margin sheet 117s is formed into a sheet shape by using a roll coater or a doctor blade, for example.

Figure 13A:
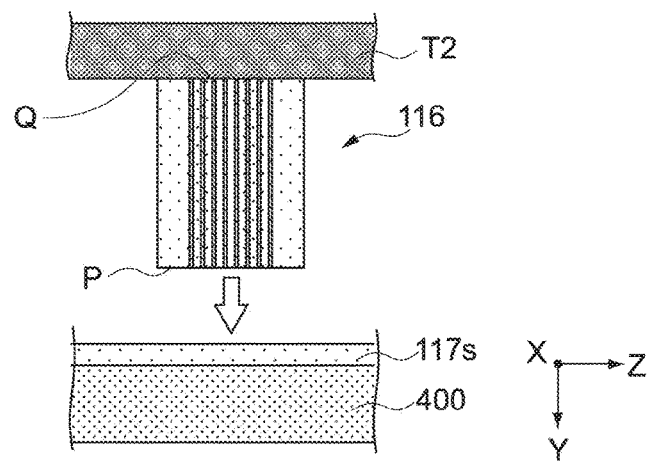
FIGS. 13A and 13B are cross-sectional views of the multi-layer chip in Step S05 of the production method.
Figure 13B:
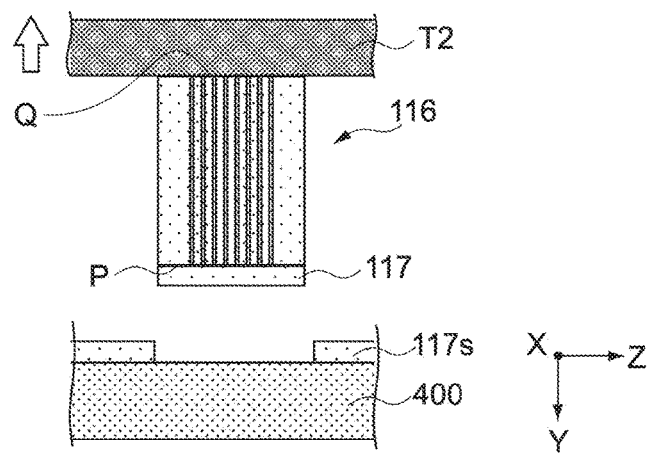

FIGS. 13A and 13B are cross-sectional views of the multi-layer chip 116 showing the process of Step S05.

First, as shown in FIG. 13A, the side margin sheet 117s is disposed on a flat plate-like elastic body 400. The multi-layer chip 116 is disposed such that the side surface P faces the side margin sheet 117s.

The side surface P of the multi-layer chip 116 is pressed against the side margin sheet 117s. The side margin sheet 117s is thus punched out by the side surface P of the multi-layer chip 116.

Subsequently, when the multi-layer chip 116 is pulled out of the side margin sheet 117s, as shown in FIG. 13B, only a side margin 117 that is punched out from the side margin sheet 117s and attached to the side surface P is separated from the elastic body 400 and remains on the multi-layer chip 116. Thus, a multi-layer chip 116 including the side margin 117 on the side surface P is obtained.

It should be noted that the side margin 117 on the side surface P of the multi-layer chip 116 may be formed by a method other than the punching described above.

For example, a side margin sheet 117s previously cut may be attached to the side surface P of the multi-layer chip 116.

Furthermore, without using the side margin sheet 117s, a ceramic paste may be applied to the side surface P of the multi-layer chip 116, and thus the side margin 117 may be formed.

Examples of a method of applying a ceramic paste include a dip method.

1.2.6 Step S06: Superficial-Layer Removal 2

In Step S06, a superficial layer of the side surface Q of the multi-layer chip 116 obtained in Step S05 is removed.

Removal of the superficial layer of the side surface Q in Step S06 can be performed similarly to the removal of the superficial layer of the side surface P in Step S04. Since the spreading sections R1 and R2 and the foreign substance R3 included in the superficial layer of the side surface Q are also removed by Step S06, a short circuit between the first internal electrode 112 and the second internal electrode 113 in the side surface Q is resolved.

Figure 14:
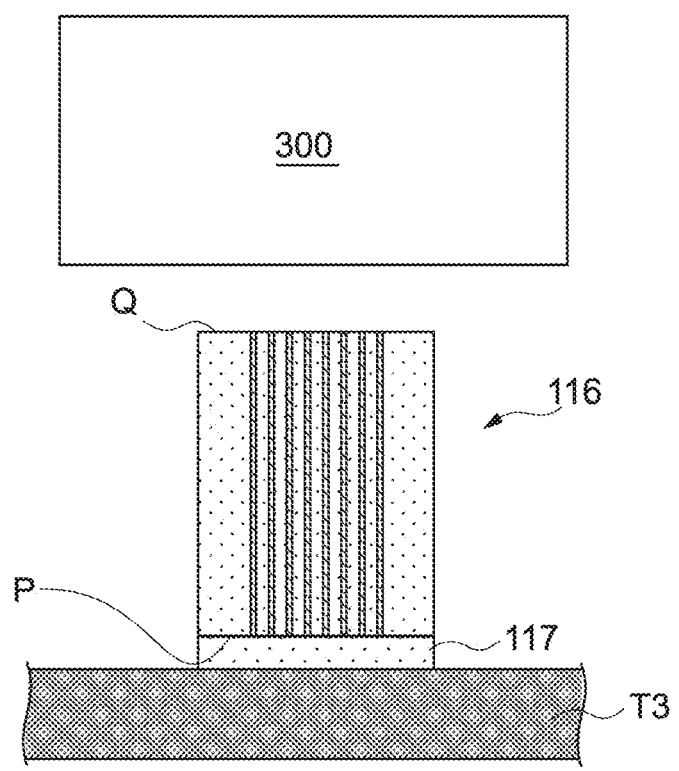
FIG. 14 is a cross-sectional view of the multi-layer chip in Step S06 of the production method.
Figure 15:
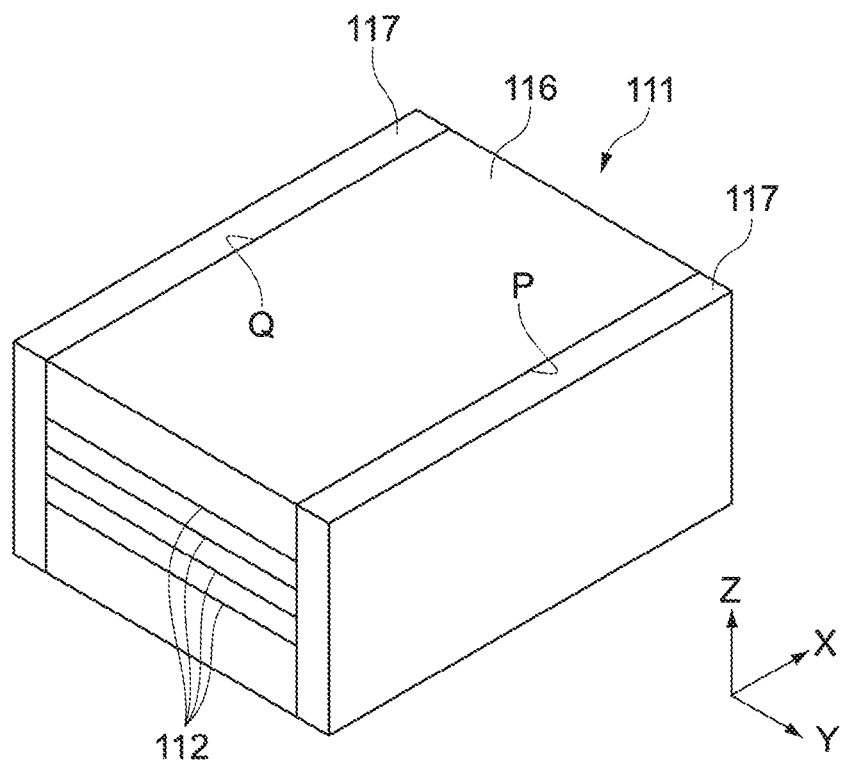
FIG. 15 is a perspective view of an unsintered body after Step S07 of the production method.

FIG. 14 is a cross-sectional view of the multi-layer chip 116 in Step S06. In Step S06, the multi-layer chip 116 is bonded to a tape T3 from the tape T2, and the side margin 117 provided to the side surface P is held by the tape T3.

With this configuration, the orientations of the side surfaces P and Q of the multi-layer chip 116 are upside down from Step S04. As a result, in Step S06, the superficial layer of the side surface Q, which is opposite to the side surface P, can be removed by a similar way to Step S04.

In Step S06, the superficial-layer removing apparatus 300 similar to that used in Step S04 can be used.

1.2.7 Step S07: Formation of Side Margins 2

In Step S07, unsintered side margins 117 are formed on the side surfaces Q of the multi-layer chips 116 obtained in Step S06. Formation of the side margins 117 on the side surfaces Q in Step S07 can be performed similarly to the formation of the side margins 117 on the side surfaces P in Step S05.

As described above, an unsintered body 111 as shown in FIG. 15 is obtained.

A form of the unsintered body 111 can be determined in accordance with a form of a sintered body 11. For example, in order to obtain the body 11 with the size of 1.0 mm×0.5 mm×0.5 mm, the unsintered body 111 with the size of 1.2 mm: 0.6 mm×0.6 mm can be produced.

1.2.8 Step S05: Sintering

In Step S08, the unsintered body 111 obtained in Step S07 is sintered to produce the body 11 of the multi-layer ceramic capacitor 10 shown in FIGS. 1 to 3. Sintering can be performed in a reduction atmosphere or a low-oxygen partial pressure atmosphere, for example.

1.2.9 Step S09: Formation of External Electrodes

In Step S09, the first external electrode 14 and the second external electrode 15 are formed on the body 11 obtained in Step S08, to produce the multi-layer ceramic capacitor 10 shown in FIGS. 1 to 3.

In Step S09, first, an unsintered electrode material is applied so as to cover one of the end surfaces of the body 11 and then applied so as to cover the other one of the end surfaces of the body 11, both the end surfaces being oriented in the X-axis direction. The unsintered electrode materials applied to the body 11 are subjected to baking in a reduction atmosphere or a low-oxygen partial pressure atmosphere, for example, to form base films on the body 11. On the base films baked onto the body 11, intermediate films and surface films are formed by plating such as electrolytic plating. Thus, the first external electrode 14 and the second external electrode 15 are completed.

It should be noted that part of the processing in Step S09 described above may be performed before Step S05. For example, before Step S05, the unsintered electrode material may be applied to both the end surfaces of the unsintered body 111 that are oriented in the X-axis direction, and in Step S05, the unsintered body 111 may be sintered and, simultaneously, the unsintered electrode material may be baked to form base layers of the first external electrode 14 and the second external electrode 15.

1.3 Superficial-Layer Removing Apparatus 300 According to Another Embodiment The superficial-layer removing apparatus 300 used in Steps S04 and S06 only needs to be capable of removing the superficial layers of the side surfaces P and Q of the multi-layer chips 116, and is not limited to the grinders 300a and 300b shown in FIGS. 11 and 12, respectively.

Figure 16A:
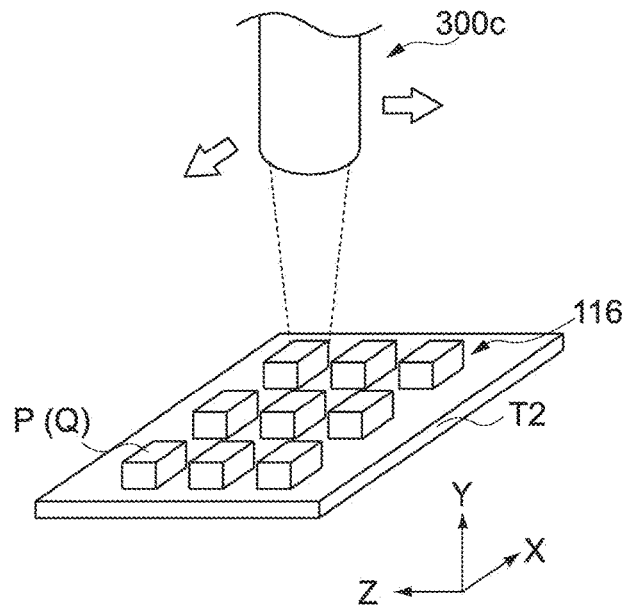
FIGS. 16A and 16B are each a perspective view of a superficial-layer removing apparatus according to another embodiment.
Figure 16B:
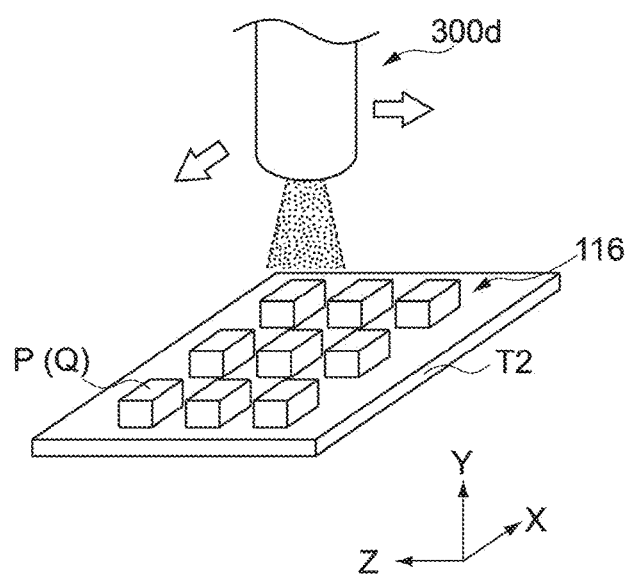

FIGS. 16A and 16B are each a view of a superficial-layer removing apparatus 300 according to another embodiment.

As shown in FIG. 16A, a laser irradiation apparatus 300e can be used as the superficial-layer removing apparatus 300. The laser irradiation apparatus 300c irradiates the side surfaces P and Q of the multi-layer chips 116 with laser, to remove the superficial layers of the side surfaces P and Q.

The laser irradiation apparatus 300c is not limited to a specific configuration, but is desirably a pulse laser apparatus having a short pulse width. With this configuration, for example, generation of foreign substances accompanied by temperature rise of the side surfaces P and Q of the multi-layer chips 116 can be suppressed. Examples of the pulse laser apparatus having a short pulse width include a pico-second laser apparatus having a pulse width in a pico-second range and a femto-second laser apparatus having a pulse width in a femto-second range.

It should be noted that conditions such as a type of laser applied by the laser irradiation apparatus 300c, a spot diameter, intensity, time length of irradiation, and the number of times of irradiation can be determined as appropriate.

Examples of the type of laser include a YAG laser and a fiber laser.

Further, when the spot diameter of laser is small, the laser irradiation apparatus 300c performs scanning in the X-axis direction and the Z-axis direction, so that the entire areas of the side surfaces P and Q of all the multi-layer chips 116 can be irradiated with laser. It should be noted that the tape T2 may be moved in the X-axis direction and the Z-axis direction instead of moving the laser irradiation apparatus 300c.

Further, in order to remove the superficial layers of the side surfaces P and Q of the multi-layer chips 116, a high energy beam other than laser can also be used. For example, when an electron beam is used as the high energy beam, a high-energy-beam irradiation apparatus including an electron gun can be used as the superficial-layer removing apparatus 300.

Furthermore, as shown in FIG. 16B, a blasting apparatus 300d can also be used as the superficial-layer removing apparatus 300. The blasting apparatus 300d sprays granular abrasive materials to the side surfaces P and Q of the multi-layer chips 116, to remove the superficial layers of the side surfaces P and Q. The size of the abrasive grains can be determined as appropriate and can be set to 3 μm or less, for example.

Blasting by the blasting apparatus 300d may be wet-blasting or dry-blasting (sandblasting, dry ice blasting, etc.). The abrasive grains used in wet-blasting or sandblasting can be selected as appropriate. For example, abrasive grains made of ceramics (alumina etc.), metal, glass, or plastic can be used. It should be noted that conditions of the blasting by the blasting apparatus 300d can be determined as appropriate.

In addition, the superficial-layer removing apparatus 300 may be configured to be capable of removing the superficial layers of the side surfaces P and Q of the multi-layer chips 116 by a method other than the above method, such as etching.

Further, in Steps S04 and S06, the superficial-layer removing apparatus 300 is not necessarily used. Part or all of the processing by the superficial-layer removing apparatus 300 described above may be performed manually or performed with use of another apparatus. For example, instead of the grinders 300a and 300b, a flat polishing plate may be used.

2. Second Embodiment

A method of removing a superficial layer according to a second embodiment of the present invention is applicable to Step S04 (Superficial-layer Removal 1) and Step S06 (Superficial-layer Removal 2) of FIG. 4, where a laser irradiation apparatus is used as the superficial-layer removing apparatus 300.

A laser irradiation apparatus used in this embodiment has a smaller spot diameter of the laser than the spot diameter of the laser of the laser irradiation apparatus 300c shown in FIG. 16A. A smaller spot diameter of the laser enables irradiation of laser having higher-energy density. This makes it possible to shorten the time length of irradiation of laser and to thus efficiently remove the superficial layers.

Figure 17:
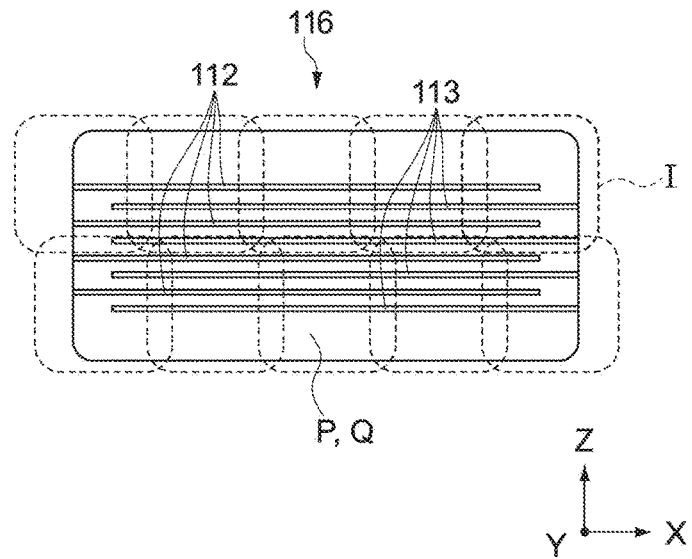
FIG. 17 is a side view of a multi-layer chip, showing a method of removing a superficial layer according to a second embodiment of the present invention.

FIG. 17 is a view of the side surface P, Q of the multi-layer chip 116 before the superficial layer is removed. FIG. 17 shows exemplary irradiation areas I by broken lines, each of the irradiation areas I being an area irradiated with laser so as to remove the superficial layer. A form of the irradiation area I depends on a spot form of the laser. In the example shown in FIG. 17, two rows of the irradiation areas I are disposed in the Z-axis direction, each of the rows including five irradiation areas I arrayed in the X-axis direction.

The irradiation areas I adjacent to one other in the X- and Z-axis directions mutually overlap. With this configuration, the irradiation areas I are disposed without gaps on the side surface P, Q of the multi-layer chip 116. As a result, irradiating all the irradiation areas I with laser can remove the superficial layers of the entire areas of the side surface P, Q of the multi-layer chip 116.

For the laser irradiation apparatus, a pulse laser apparatus capable of moving a laser spot by controlling an angle of a mirror that reflects laser can be used, for example. In such a laser irradiation apparatus, a laser spot is moved to a different irradiation area I by one time laser irradiation, so that all the irradiation areas I can be irradiated with laser.

A form of the laser spot is desirably rectangular, that is, each irradiation area I is desirably rectangular. With this configuration, even when the amount of overlap of the irradiation areas I is made smaller, gaps are difficult to form between the irradiation areas I. This enables all the areas of the side surfaces of the multi-layer chip to be efficiently irradiated with laser. The four corners of each irradiation area I may be rounded.

The laser desirably has a top-hat output distribution. With this configuration, the output distribution of the laser is made uniform in the entire areas of the irradiation areas I. Thus, the positions, intervals, and the like of the irradiation areas I on the side surface P, Q of the multi-layer chip 116 can be determined without considering the output distribution of the laser.

Figure 18:
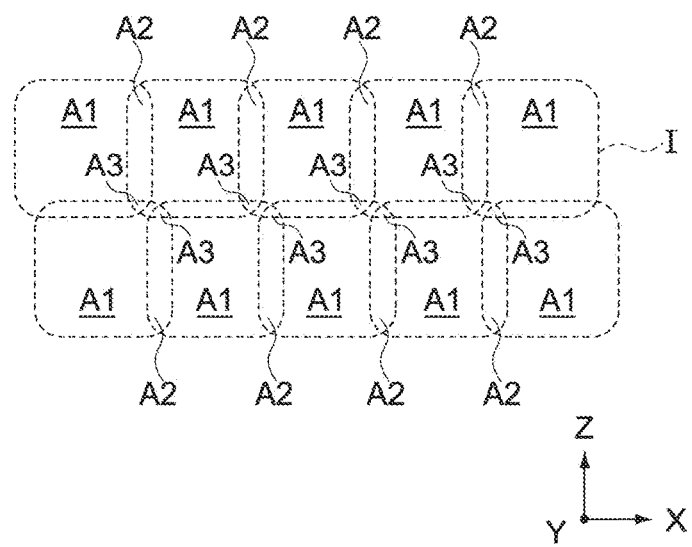
FIG. 18 is a view showing laser irradiation areas by the method of removing a superficial layer.

FIG. 18 is a view showing only the irradiation areas I of FIG. 17. As described above, since the adjacent irradiation areas I mutually overlap in the X- and Z-axis directions, a series of laser irradiation forms areas A1 irradiated with laser one time, areas A2 irradiated with laser two times, and areas A3 irradiated with laser three times.

Figure 19:
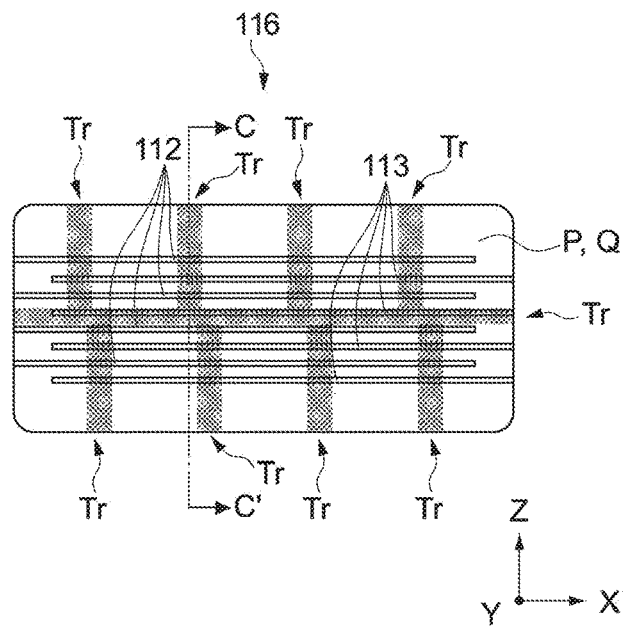
FIG. 19 is a side view of the multi-layer chip after the method of removing a superficial layer is executed.

FIG. 19 is a view showing the side surface P, Q of the multi-layer chip 116 after all the irradiation areas I are irradiated with laser. On the side surface P, Q of the multi-layer chip 116, overlap marks Tr formed by the laser irradiation are found in the areas A2 and A3 in which the irradiation areas I overlap and which are irradiated with laser a plurality of times.

In the areas A2 and A3 on the side surface P, Q of the multi-layer chip 116, the superficial-layer removal by the laser irradiation is performed a plurality of times. As a result, the superficial-layer removal in the areas A2 and A3 is advanced more than the superficial-layer removal in the area A1 in which the superficial-layer removal by the laser irradiation is performed one time. This leads to appearance of the overlap marks Tr on the side surface P, Q of the multi-layer chip 116.

Thus, if the overlap marks Tr are formed at end portions of the irradiation areas I in the X- and Z-axis directions, it is found that the laser is applied without gaps. To the contrary, if the overlap marks Tr are not formed at end portions of the irradiation areas I in the X- and Z-axis directions, there is a high possibility that gaps are formed between the adjacent irradiation areas I.

In such a manner, when the overlap marks Tr on the side surface P, Q of the multi-layer chip 116 are confirmed visually or through images, it is easily determined whether all the areas on the side surface P, Q of the multi-layer chip 116 are irradiated with laser without gaps. Thus, it is possible to eliminate multi-layer chips 116 in which the side surfaces P and Q include areas not irradiated with laser.

In this embodiment, since the form of the irradiation area I (i.e., laser spot form) is rectangular, the overlap marks Tr having the patterns as shown in FIG. 19 are formed, for example. Specifically, overlap marks Tr extending in the entire areas in the X-axis direction, and overlap marks Tr arrayed in the X-axis direction at regular intervals and extending in the Z-axis direction are formed.

Figure 20:
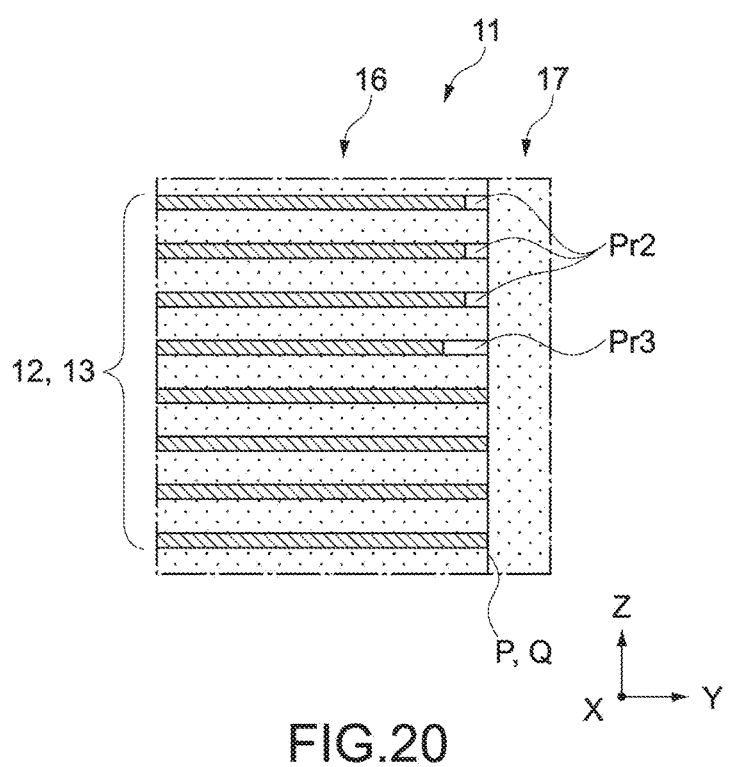
FIG. 20 is a partial cross-sectional view of a body of a multi-layer ceramic capacitor produced by the method of removing a superficial layer.

FIG. 20 is a partial cross-sectional view of the body 11 of the multi-layer ceramic capacitor 10 produced by the method of removing a superficial layer according to this embodiment. FIG. 20 shows a cross section of the body 11, which corresponds to the position of the C-C' line in FIG. 19. FIG. 20 partially shows the vicinity of an interface between the multi-layer chip 16 and the side margin 17 in the body 11.

In the areas where the overlap marks Tr shown in FIG. 19 are formed, the first and second internal electrodes 112 and 113 are removed by the laser irradiation, and thus pores Pr2 and Pr3 are formed at end portions of the first and second internal electrodes 12 and 13. Meanwhile, in the areas where the overlap marks Tr are not formed, pores are scarcely formed at the end portions of the first and second internal electrodes 12 and 13.

In other words, the presence of the overlap marks Tr in the body 11 after the side margins 17 are formed can be confirmed by the presence of the pores Pr2 and Pr3 in the cross section of the body 11. Identifying the positions of the pores Pr2 and Pr3 in the cross sections of the body 11 can determine the positions or forms of the overlap marks Tr.

In the body 11 including the pores Pr2 and Pr3, vaporized binder components or solvent components are easily discharged to the outside through the pores Pr2 and Pr3 in debinder processing before sintering. As a result, in the body 11 according to this embodiment, an effect of suppressing reduction in performance due to the remaining binder components or solvent components can be obtained.

It should be noted that dimensions of the pores Pr2 and Pr3 in the Y-axis direction increase as the number of times of laser irradiation increases. Thus, as shown in FIG. 20, the pore Pr3 corresponding to the area A3 irradiated with laser three times has a larger dimension in the Y-axis direction than the pore Pr2 corresponding to the area A2 irradiated with laser two times.

The configuration of this embodiment can be changed as appropriate. For example, the form of the irradiation area I (i.e., laser spot form) may not be rectangular and may be circular, elliptical, or polygonal, for example. Further, the laser output distribution in the irradiation areas I is not limited to the top-hat type, and may be a Gaussian type, for example.

3. Other Embodiments

While the embodiments of the present invention have been described, the present invention is not limited to the embodiments described above, and it should be appreciated that the present invention may be variously modified.

For example, the steps shown in FIG. 4 may be performed in different order as needed.

In one example, the unsintered multi-layer chips 116 obtained by the singulation in Step S03 may be sintered, and the sintered multi-layer chips 16 may be provided with the side margins 117. In this case, the sintered multi-layer chips 16 can be subjected to Steps S04 to S08.

Furthermore, in the first and second embodiments described above, the superficial layers of the side surfaces P of the multi-layer chips 116 are removed in Step S04, and the superficial layers of the side surfaces Q of the multi-layer chips 116 are removed in Step S06. However, the superficial layers of the side surfaces P and Q of the multi-layer chips 116 may be removed at the same time. In this case, for example, with both the main surfaces of the multi-layer chips 116 oriented in the Z-axis direction being held, the side surfaces P and Q of the multi-layer chips 116 can be simultaneously irradiated with laser.

In addition, in the first and second embodiments described above, the multi-layer ceramic capacitor has been described as an example of a multi-layer ceramic electronic component, but the present invention can be applied to any other multi-layer ceramic electronic components in which internal electrodes are alternatively disposed to form pairs. Examples of such multi-layer ceramic electronic components include a piezoelectric element.

What is claimed is:

1. A multi-layer ceramic electronic component, comprising:
    a multi-layer chip including
        ceramic layers laminated in a first direction,
        internal electrodes disposed between the ceramic layers,
        a plurality of pores respectively formed at end portions of the internal electrodes in a second direction orthogonal to the first direction, and
        a side surface that is orthogonal to the second direction and that includes a first area and a second area; and
    a side margin that covers the side surface of the multi-layer chip,
    wherein the plurality of pores include a first pore corresponding to the first area of the side surface and a second pore corresponding to the second area of the side surface,
    wherein the second pore has a larger dimension than the first pore,
    wherein each pore of the plurality of pores includes an open space between the side margin and the end portion of the respective internal electrode at which it is formed, and
    wherein the first area and the second area each form a predetermined pattern.

2. The multi-layer ceramic electronic component according to claim 1, wherein
    the first area and the second area are arrayed at predetermined intervals.

3. The multi-layer ceramic electronic component according to claim 1, wherein
    the predetermined pattern is any one of rectangular, circular, elliptical, or polygonal.

* * * * *